(12) United States Patent
Weindorf et al.

(10) Patent No.: US 11,256,117 B2
(45) Date of Patent: Feb. 22, 2022

(54) ELECTRO-OPTICAL REFLECTION SYSTEMS

(71) Applicant: VISTEON GLOBAL TECHNOLOGIES, INC., Van Buren Township, MI (US)

(72) Inventors: Paul Frederick Luther Weindorf, Novi, MI (US); Qais Sharif, Northville, MI (US); Brian Hayden, Royal Oak, MI (US); Elijah Louis Auger, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 387 days.

(21) Appl. No.: 16/224,195

(22) Filed: Dec. 18, 2018

(65) Prior Publication Data

US 2019/0353946 A1  Nov. 21, 2019

Related U.S. Application Data

(60) Provisional application No. 62/673,489, filed on May 18, 2018, provisional application No. 62/685,453, filed on Jun. 15, 2018.

(51) Int. Cl.

| | | |
|---|---|---|
| G02F 1/133 | (2006.01) | |
| G02F 1/137 | (2006.01) | |
| G02F 1/1335 | (2006.01) | |
| G02F 1/13363 | (2006.01) | |
| B60R 1/00 | (2006.01) | |
| B60R 1/08 | (2006.01) | |
| B60K 35/00 | (2006.01) | |
| G02F 1/01 | (2006.01) | |

(52) U.S. Cl.
CPC .......... *G02F 1/13318* (2013.01); *B60K 35/00* (2013.01); *B60R 1/006* (2013.01); *B60R 1/08* (2013.01); *G02F 1/0136* (2013.01); *G02F 1/13363* (2013.01); *G02F 1/13725* (2013.01); *G02F 1/133553* (2013.01); *G02F 1/133638* (2021.01)

(58) Field of Classification Search
None
See application file for complete search history.

(56) References Cited

U.S. PATENT DOCUMENTS

2015/0168776 A1* 6/2015 Song .................. H01L 51/5281
349/62

* cited by examiner

*Primary Examiner* — Ashok Patel
(74) *Attorney, Agent, or Firm* — Quinn IP Law (57) ABSTRACT

An electro-optical system includes a voltage supply device, an active polarizing layer, a retarding layer, and a reflective layer. The active polarizing layer is electrically coupled to the voltage supply device. The active polarizing layer is configured to switch back and forth between a non-polarized state and a polarized state as the voltage supply device supplies varying levels of voltage. The retarding layer is configured to alter the polarization state of light traveling through it. The reflective layer is positioned adjacent to the retarding layer.

14 Claims, 10 Drawing Sheets

ELECTRO-OPTICAL REFLECTION SYSTEMS

CROSS REFERENCE TO RELATED APPLICATIONS

The present application claims the benefit of U.S. Provisional Application No. 62/673,489, filed May 18, 2018 and U.S. Provisional Application No. 62/685,453, filed Jun. 15, 2018, the contents of which are incorporated herein in their entirety.

FIELD OF THE DISCLOSURE

This disclosure generally relates to electro-optical reflection systems which allow the reflection of light to be alternatingly reduced while maintaining high display transmission rates. One or more embodiments herein provide for electro-optical reflection systems which allow for the auto-dimming of light reflected off a mirror.

BACKGROUND

Electronic mirrors often use electrochromic elements with a semitransparent mirror in order to view a display on the mirror. However, this often results in the reflection of ambient light significantly interfering with the display while the electronic mirror is in a display mode. As a result, extremely high luminance values are required in order to adequately view the display. This unduly increases the cost to power the display.

A display system is needed to maintain high transmissivity of transmitted display light while reducing the reflection of ambient light in order to reduce the cost to power the system.

SUMMARY

In one embodiment, an electro-optical system includes a voltage supply device, an active polarizing layer, a retarding layer, and a reflective layer. The active polarizing layer is electrically coupled to the voltage supply device. The active polarizing layer is configured to switch back and forth between a non-polarized state and a polarized state as the voltage supply device supplies varying levels of voltage. The retarding layer is configured to alter the polarization state of light traveling through it. The reflective layer is positioned adjacent to the retarding layer. The reflective layer includes an organic light emitting diode display.

In another embodiment, an electro-optical system for a vehicle includes a polarizing layer, a retarding layer, a voltage supply device, and a reflective layer. The retarding layer is positioned adjacent to the polarizing layer. The voltage supply device is electrically coupled to the polarizing layer or the retarding layer. The reflective layer is positioned adjacent to the retarding layer. The reflective layer includes an organic light emitting diode display. The electro-optical system is configured to, in one state, be a reflective mirror reflecting ambient light, and in another state, be a visual display displaying light transmitted from the organic light emitting diode display.

In still another embodiment, a non-transitory computer-readable storage medium is disclosed. The non-transitory computer-readable storage medium includes instructions, that, when executed by a processor of an electro-optical system, cause the processor to switch between a reflective mirror state and a visual display state. In the reflective mirror state the instructions cause the processor to: supply, from a voltage supply device, a first level of voltage to an active polarizing layer wherein the first level of voltage causes the active polarizing layer to operate in a non-polarized state; and cause an organic light emitting diode display to not transmit light. In the visual display state the instructions cause the processor to: supply, from the voltage supply device, a second level of voltage to the active polarizing layer, the second level of voltage causing the active polarizing layer to operate in a polarized state; and cause the organic light emitting diode display to transmit light.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
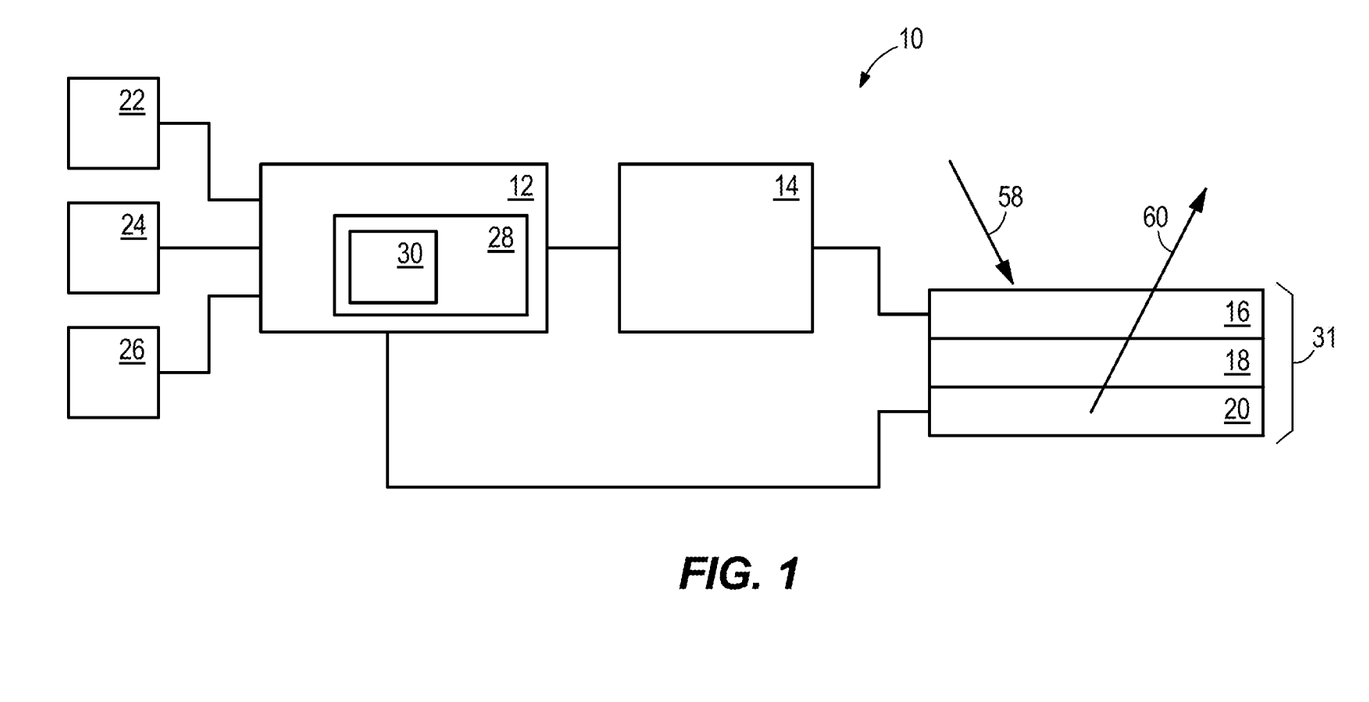
FIG. 1 illustrates a box diagram of one embodiment of an electro-optical system.

FIG. 1 illustrates a box diagram of one embodiment of an electro-optical system 10. The electro-optical system 10 may comprise a portion of a vehicle such as a rear-view mirror, a visor mirror, a side-mirror, or another type of vehicle display and/or mirror. In other embodiments, the electro-optical system 10 may be implemented in varying non-vehicle devices or systems. The electro-optical system 10 comprises a full circuit of electrically connected components comprising a processor 12, a voltage supply device 14, an active polarizing layer 16, a retarding layer 18, a reflective layer 20, sensors 22 and 24, and input device(s) 26. The processor 12 is connected to or comprises a memory 28 which contains programming code 30. The processor 12 controls the electro-optical system 10 following the instructions/algorithms contained in the programming code 30. The instructions that are executed by the processor 12 may be stored in a non-transitory computer-readable storage medium. The input device(s) 26 provide inputs to the processor 12.

The input device(s) 26 may comprise any type of device(s) which provide input to the processor 12 such as touch-activated instructions inputted from a touch screen, voice-activated inputs inputted from an audio device, manual inputs inputted from a controller, external inputs inputted from an external device, or from varying input device(s). The sensor 22 comprises a forward looking light sensor which detects the amount of light in a forward direction. The sensor 24 comprises a rear looking sensor which detects the amount of light in a rear direction.

The voltage supply device 14 comprises a device which is electrically coupled to and supplies voltage to the electro-optical system 10 to drive the system. The voltage supply device 14 drives the active polarizing layer 16. The voltage supply device 14 comprises a liquid crystal driver. In other embodiments, the voltage supply device 14 may vary. The active polarizing layer 16 is optically connected to the retarding layer 18 and the reflective layer 20 to form electro-optic device 31. The retarding layer 18 is abutted against and between the active polarizing layer 16 and the reflective layer 20.

Figure 2:
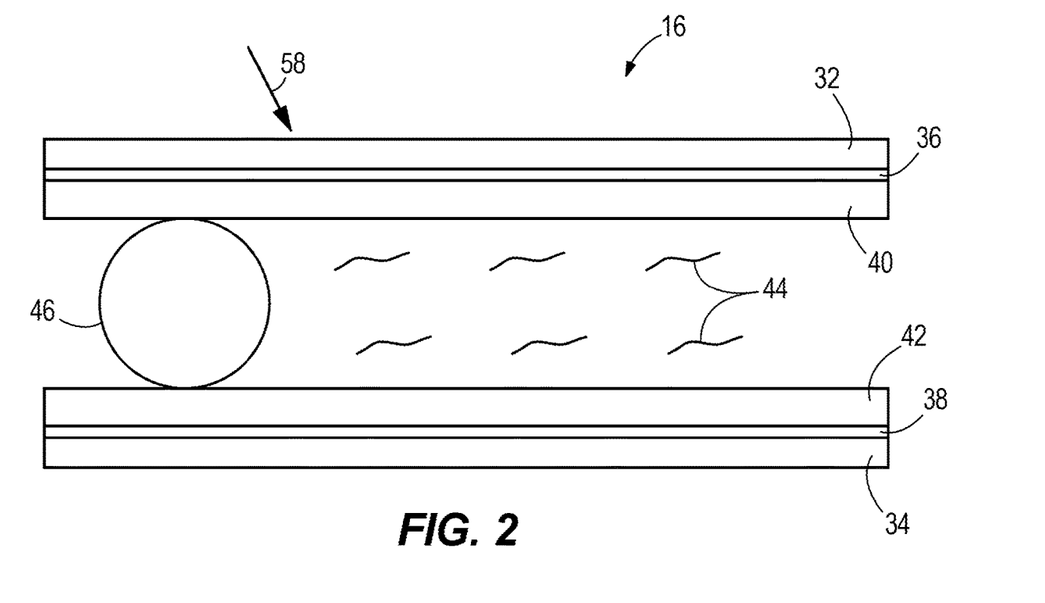
FIG. 2 illustrates a cross-section view through an active polarizing layer of the electro-optical system of FIG. 1.

FIG. 2 illustrates a cross-section view through the active polarizing layer 16 of FIG. 1. As shown, the active polarizing layer 16 comprises glass or substrate layers 32 and 34, transparent conductive layers 36 and 38, rubbing layers 40 and 42, a guest-host dichroic dye liquid crystal layer 44, and a spacer 46 holding the rubbing layers 40 and 42 apart. The guest dye is a collection of elongated molecules that can either be orthogonal or parallel based on the applied voltage. The orientation of the elongated molecules determines the polarization associated with the active polarizing layer 16. The active polarizing layer 16 is configured to switch back and forth between a non-polarized state and a polarized state as the voltage supply device 14 supplies varying levels of voltage. The active polarizing layer 16 comprises a vertical transmission axis. In other embodiments, the active polarizing layer 16 may vary in type or configuration.

Referring back to FIG. 1, the retarding layer 18 is configured to alter the polarization state of light traveling through it. The retarding layer 18 comprises a ¼ wavelength retarding layer. In other embodiments, the retarding layer 18 may vary in type.

Figure 3:
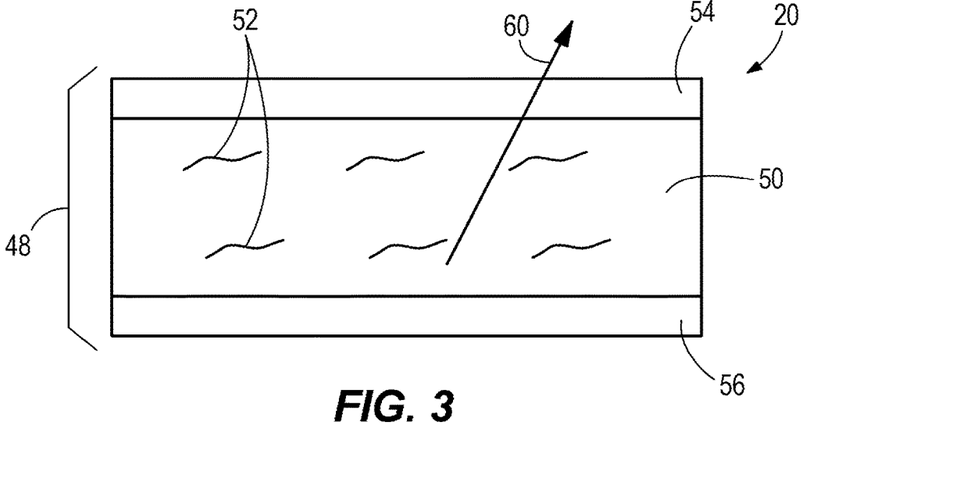
FIG. 3 illustrates a cross-section view through a reflective layer of the electro-optical system of FIG. 1.

FIG. 3 illustrates a cross-section view through the reflective layer 20 of FIG. 1. As shown collectively in FIGS. 1 and 3, the reflective layer 20 comprises a portion of a display 48. The display 48 comprises an organic layer 50 comprising an organic light emitting diode 52 disposed between a transparent electrode 54 and a second electrode 56. In other embodiments, the reflective layer 20 may be associated with other types of device/systems. For instance, in one embodiment the reflective layer 20 may comprise a mirror and may not be associated with a display. In still other embodiments, the reflective layer 20 may vary further.

As shown collectively in FIGS. 1-3, the reflective layer 20 of the electro-optical system 10 is configured to in one state be a reflective mirror reflecting ambient light 58 when the organic light emitting diode 52 is not transmitting the light 60 and the active polarizing layer 16 is in the non-polarized state. The reflective layer 20 of the electro-optical system 10 is configured to in another state be a visual display displaying light 60 transmitted from the organic light emitting diode 52 while the active polarizing layer 16 is in a polarized state.

The reflective layer 20 of the electro-optical system is configured in still another state to be a reflective mirror reflecting ambient light 58 while the active polarizing layer 16 is in the non-polarized state and the light 60 is transmitting from the organic light emitting diode 52 to display symbols on the reflective layer 20 forming the reflective mirror. In such manner, both reflection and display functions can be achieved simultaneously.

In another embodiment, the reflective layer 20 of the electro-optical system 10 may comprise a dimmable mirror having higher reflectivity when the active polarizing layer 16 is in the non-polarized state, and having lower reflectivity when the active polarizing layer 16 is in the polarized state. Depending on the forward looking light sensor 22 measured light levels, as the rear looking light sensor 24 detects more light than the forward looking light sensor 22, the processor 12 controls the voltage supply device 14 to put the active polarizing layer 16 into the polarized state to decrease the reflectivity of the dimmable mirror of the reflective layer 20. Depending on the forward looking light sensor 22 measured light levels, as the rear looking light sensor 24 detect less light than the forward looking light sensor 22 the processor 12 controls the voltage supply device 14 to put the active polarizing layer 16 into the non-polarized state to increase the reflectivity of the dimmable mirror of the reflective layer 20.

Testing of the electro-optical system 10 revealed the following unexpected results in the minimum reflectance state: a transmission of the light 60 transmitting from the organic light emitting diode 52 of 54%; luminescence of 324 Nits; minimum reflectance of the ambient light 58 of 19% without an anti-reflection surface and 15% if an anti-reflection surface was utilized; and at a reasonable cost to both manufacture and operate the electro-optical system 10. Moreover, testing of the electro-optical system under maximum reflection conditions revealed the following unexpected results: a maximum reflectance of the ambient light 58 of 49% without an anti-reflection surface and 45% if an anti-reflection surface was utilized. These results were a substantially unexpected improvement over the transmissivity and reflectivity rates of other known display mirror systems which can have transmissivities of display light of 40% or lower while having reflectance of ambient light of 70% or greater at substantial manufacturing and operation cost.

Figure 4:
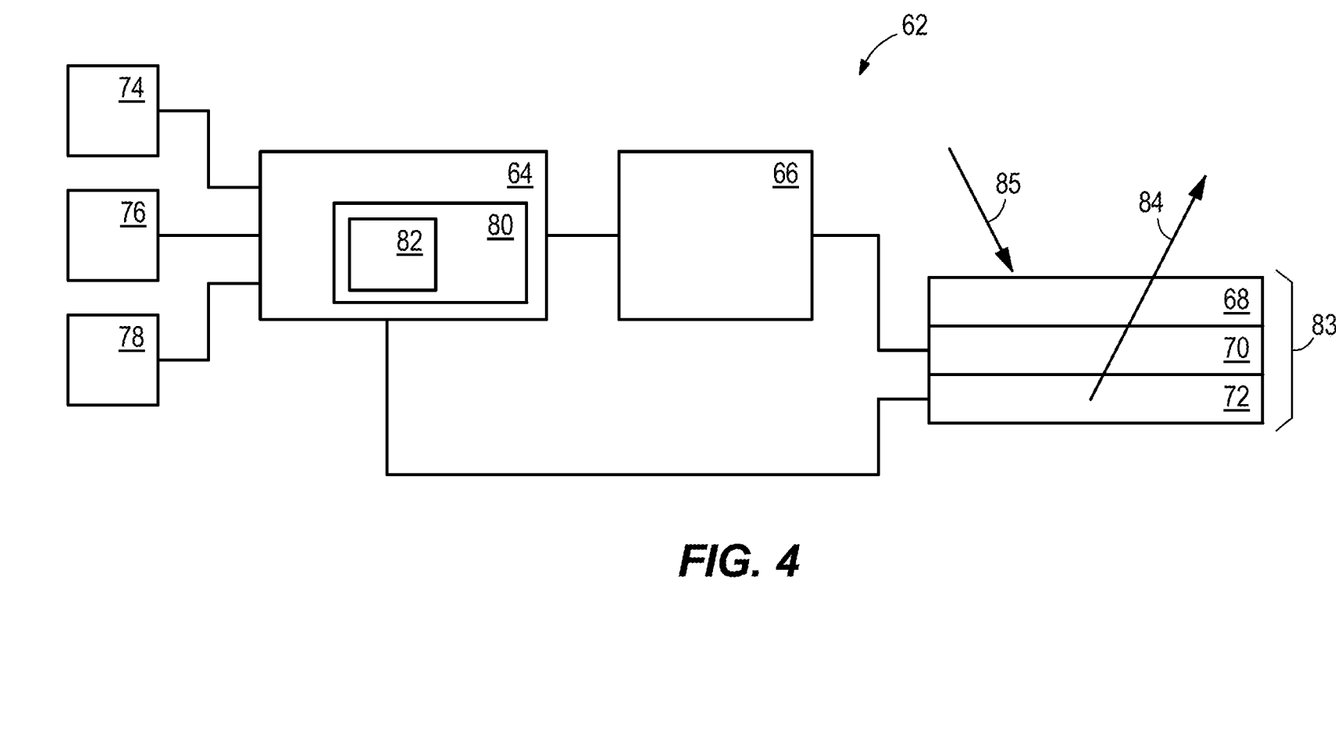
FIG. 4 illustrates a box diagram of another embodiment of an electro-optical system.

FIG. 4 illustrates a box diagram of another embodiment of an electro-optical system 62. The electro-optical system 62 may comprise a portion of a vehicle such as a rear-view mirror, a visor mirror, a side-mirror, or another type of vehicle display and/or mirror. In other embodiments, the electro-optical system 62 may be implemented in varying non-vehicle devices or systems. The electro-optical system 62 comprises a full circuit of electrically connected components comprising a processor 64, a voltage supply device 66, a passive polarizing layer 68, an active retarding layer 70, a reflective layer 72, sensors 74 and 76, and input device(s) 78. The processor 64 is connected to or comprises a memory 80 which contains programming code 82. The processor 64 controls the electro-optical system 62 following the instructions/algorithms contained in the programming code 82. The instructions that are executed by the processor 64 may be stored in a non-transitory computer-readable storage medium. The input device(s) 78 provide inputs to the processor 64.

The input device(s) 78 may comprise any type of device(s) which provide input to the processor 64 such as touch-activated instructions inputted from a touch screen, voice-activated inputs inputted from an audio device, manual inputs inputted from a controller, external inputs inputted from an external device, or from varying input device(s). The sensor 74 comprises a forward looking light sensor which detects the amount of light in a forward direction. The sensor 76 comprises a rear looking sensor which detects the amount of light in a rear direction.

The voltage supply device 66 comprises a device which is electrically coupled to and supplies voltage to the electro-optical system 62 to drive the system. The voltage supply device 66 drives the active retarding layer 70. The voltage supply device 66 comprises a liquid crystal driver. In other embodiments, the voltage supply device 66 may vary. The active retarding layer 70 is optically connected to the passive polarizing layer 68 and the reflective layer 72 to form electro-optic device 83. The active retarding layer 70 is abutted against and between the passive polarizing layer 68 and the reflective layer 72.

The passive polarizing layer 68 alters the polarization state of light that travels through it. The passive polarizing layer 68 comprises a vertical transmission axis. In other embodiments, the polarizing layer 68 may vary in type or configuration.

Figure 5:
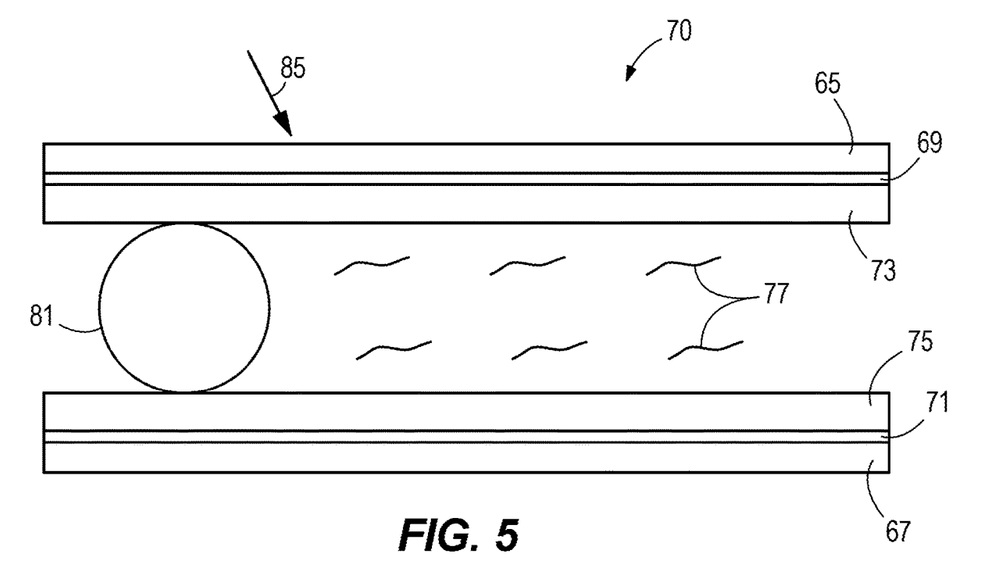
FIG. 5 illustrates a cross-section view through an active retarding layer of the electro-optical system of FIG. 4.

FIG. 5 illustrates a cross-section view through the active retarding layer 70 of FIG. 4. The active retarding layer 70 comprises a ¼ wavelength retarding layer. As shown, the active retarding layer 70 comprises glass or substrate layers 65 and 67, transparent conductive layers 69 and 71, rubbing layers 73 and 75, a guest-host liquid crystal layer 77, and a spacer 81 holding the rubbing layers 73 and 75 apart. The guest-host liquid crystal layer 77 is configured to either be in an orthogonal or parallel configuration based on the applied voltage. The active retarding layer 70 is configured to switch, depending on the level of voltage the voltage supply device 66 supplies, between a retarding state in which the active retarding layer 70 alters the polarization state of light traveling through it and a non-retarding state in which the active retarding layer 70 does not alter the polarization of the light traveling through it. In other embodiments, the active retarding layer 70 may vary in type or configuration.

Figure 6:
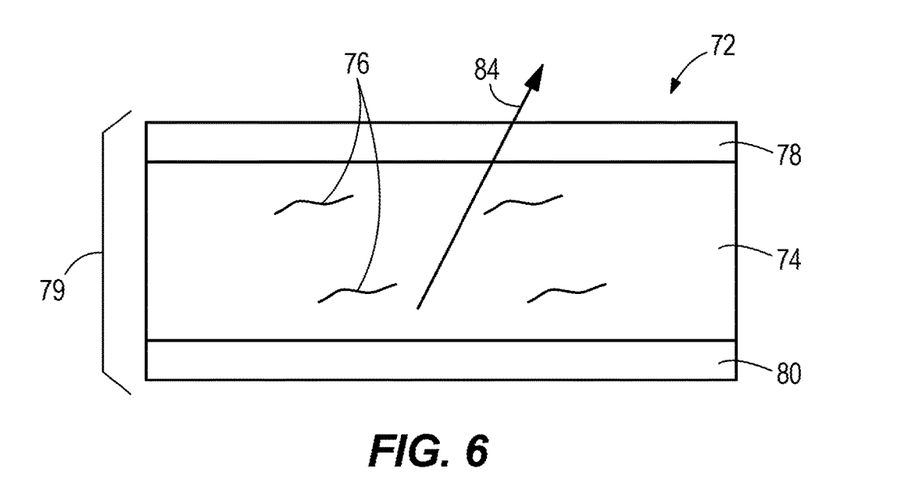
FIG. 6 illustrates a cross-section view through a display of the electro-optical system of FIG. 4.

FIG. 6 illustrates a cross-section view through the reflective layer 72 of FIG. 4. As shown collectively in FIGS. 4 and 6, the reflective layer 72 comprises a portion of a display 79. The display 79 comprises an organic layer 74 comprising an organic light emitting diode 76 disposed between a transparent electrode 78 and a second electrode 80. In other embodiments, the reflective layer 72 may be associated with other types of devices/systems. For instance, in one embodiment the reflective layer 72 may comprise a mirror and may not be associated with a display. In still other embodiments, the reflective layer 72 may further vary.

As shown collectively in FIGS. 4-6, the reflective layer 72 of the electro-optical system 62 is configured to in one state be a reflective mirror reflecting ambient light 85 when the organic light emitting diode 76 is not transmitting the light 84 and the active retarding layer 70 is in the non-retarding state in which the active retarding layer 70 does not alter the polarization of the light traveling through it. The reflective layer 72 of the electro-optical system 62 is configured to in another state be a visual display displaying light 84 transmitted from the organic light emitting diode 76 while the active retarding layer 70 is in the retarding state in which the active retarding layer 70 alters the polarization state of the light traveling through it.

The reflective layer 72 of the electro-optical system is configured in still another state to be a reflective mirror reflecting ambient light 85 while the active retarding layer 70 is in the non-retarding state and the light 84 is transmitting from the organic light emitting diode 76 to display symbols on the reflective layer 72 forming the reflective mirror. In such manner, both reflection and display functions can be achieved simultaneously.

In another embodiment, the reflective layer 72 of the electro-optical system 62 may comprise a dimmable mirror having higher reflectivity when the active retarding layer 70 is in the non-retarding state, and having lower reflectivity when the active retarding layer 70 is in the retarding state. Depending on the forward looking light sensor 74 measured light levels, as the rear looking light sensor 76 detect more light the processor 64 controls the voltage supply device 66 to put the active retarding layer 70 into the retarding state to decrease the reflectivity of the dimmable mirror of the reflective layer 72. Depending on the forward looking light sensor 74 measured light levels, as the rear looking light sensor 76 detect less light the processor 64 controls the voltage supply device 66 to put the active retarding layer 70 into the non-retarding state to increase the reflectivity of the dimmable mirror of the reflective layer 72.

In other embodiments, the electro-optical system 62 may vary. For instance, in other embodiments the electro-optical system 62 may comprise varying types of components in varying configurations.

Testing of the electro-optical system 62 revealed the following unexpected results in the minimum reflectance state: a transmission of the light 84 transmitting from the organic light emitting diode 76 of 40%; luminescence of 240 Nits; minimum reflectance of the ambient light 85 of 4% without an anti-reflection surface and 0% if an anti-reflection surface was utilized; and at a reasonable cost to both manufacture and operate the electro-optical system 62. Moreover, testing of the electro-optical system under maximum reflection conditions revealed the following unexpected results: a maximum reflectance of the ambient light 85 of 24.9% without an anti-reflection surface and 24.5% if an anti-reflection surface was utilized. These results were a substantially unexpected improvement over the transmissivity and reflectivity rates of other known display mirror systems which can have transmissivities of display light of 40% or lower while having reflectance of ambient light of 70% or greater at substantial manufacturing and operation cost.

Figure 7:
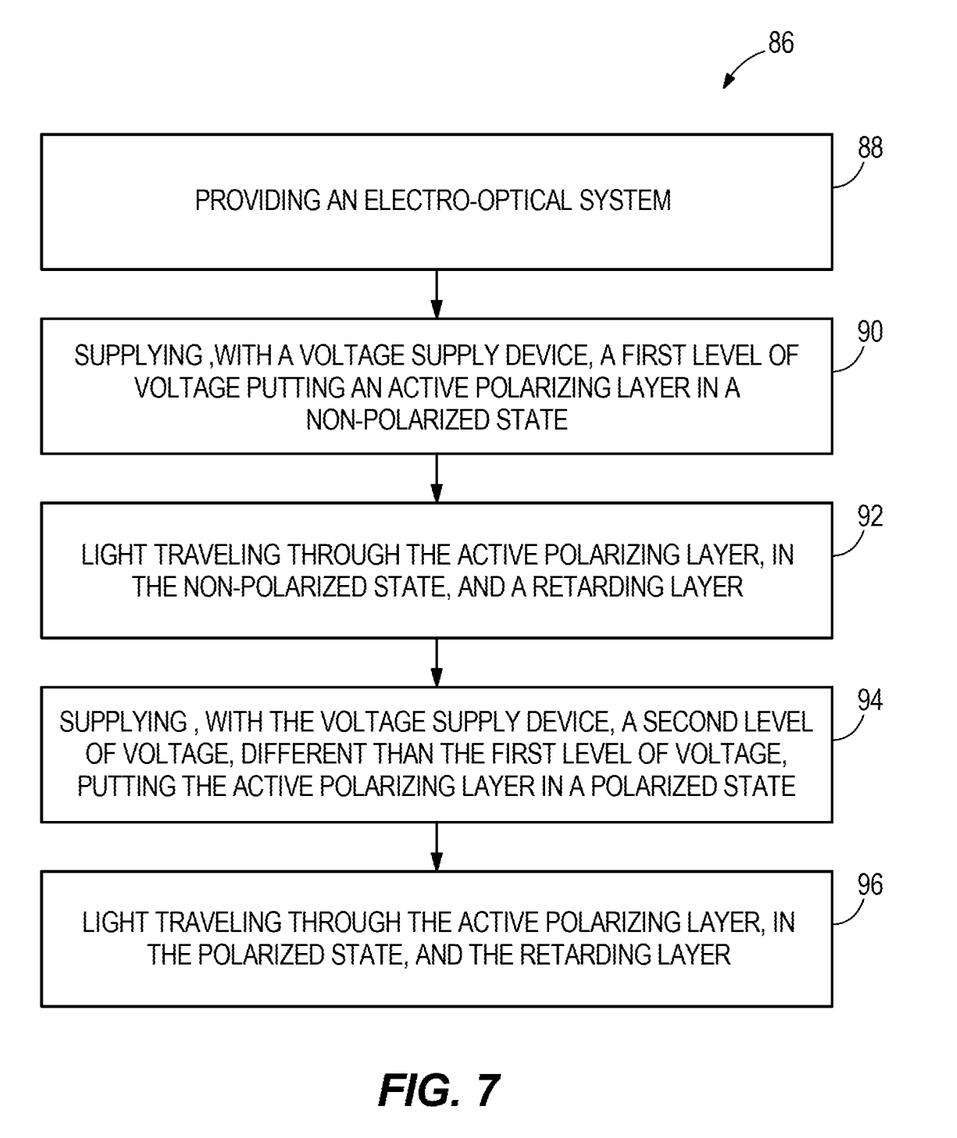
FIG. 7 is a flowchart illustrating one embodiment of a method of operating an electro-optical system.

FIG. 7 is a flowchart illustrating one embodiment of a method 86 of operating an electro-optical system. The method 86 may utilize the electro-optical system disclosed in FIGS. 1-3 as discussed above. Step 88 comprises providing an electro-optical system. The electro-optical system comprises a voltage supply device, an active polarizing device, a retarding layer, and a reflective layer. The active polarizing layer is electrically coupled to the voltage supply device. The retarding layer is configured to alter the polarization state of light traveling through it. Step 90 comprises the voltage supply device supplying a first level of voltage putting the active polarizing layer in a non-polarized state. Step 92 comprises light traveling through the active polarizing layer, in the non-polarized state, and the retarding layer. Step 94 comprises the voltage supply device supplying a second level of voltage, different than the first level of voltage, putting the active polarizing layer in a polarized state. Step 96 comprises the light traveling through the active polarizing layer, in the polarized state, and the retarding layer.

In one embodiment of the method 86, the reflective layer comprises a display, which may comprise organic or inorganic light emitting diode technology, and the electro-optical system is in a reflective mirror state reflecting ambient light when the display is not transmitting light and the active polarizing layer is in the non-polarized state. In the same embodiment, the electro-optical system is in a visual display state when the display is transmitting the light and the active polarizing layer is in the polarized state.

In another embodiment of the method 86, the reflective layer comprises a display, which may comprise organic or inorganic light emitting diode technology, and while the active polarizing layer is in the non-polarized state the electro-optical system is in a reflective mirror state reflecting ambient light while light is transmitted from the display.

In still another embodiment of the method 86, the electro-optical system comprises a dimmable mirror and a light sensor, and when the light sensor detects more of the light the active polarizing layer is put into the polarized state causing the dimmable mirror to have lower reflectivity. In the same embodiment, when the light sensor detects less of the light the active polarizing layer is put into the non-polarized state causing the dimmable mirror to have higher reflectivity.

Figure 8:
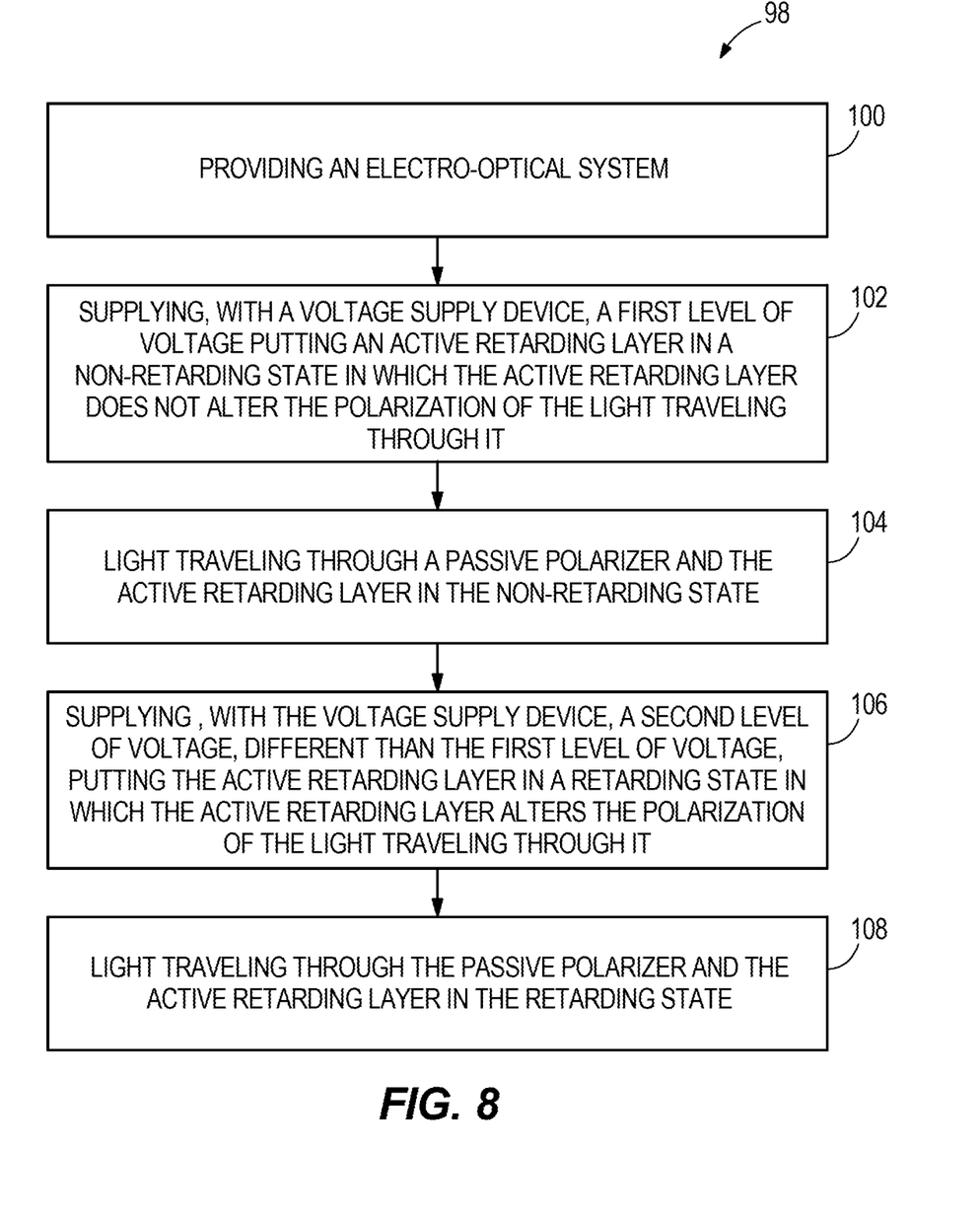
FIG. 8 is a flowchart illustrating another embodiment of a method of operating an electro-optical system.

FIG. 8 is a flowchart illustrating one embodiment of a method 98 of operating an electro-optical system. The method 98 may utilize the electro-optical system disclosed in FIGS. 4-6 as discussed above. Step 100 comprises providing an electro-optical system. The electro-optical system comprises a voltage supply device, an active retarding layer, a passive polarizing layer, and a reflective layer. The active retarding layer is electrically coupled to the voltage supply device. The passive polarizing layer is configured to alter the polarization state of light traveling through it. Step 102 comprises the voltage supply device supplying a first level of voltage putting the active retarding layer in a non-retarding state in which the active retarding layer does not alter the polarization of the light traveling through it. Step 104 comprises light traveling through the passive polarizer and the active retarding layer in the non-retarding state. Step 106 comprises the voltage supply device supplying a second level of voltage, different than the first level of voltage, putting the active retarding layer in a retarding state in which the active retarding layer alters the polarization of the light traveling through it. Step 108 comprises the light traveling through the passive polarizer and the active retarding layer in the retarding state.

In one embodiment of the method 98, the reflective layer comprises a display, which may comprise organic or inorganic light emitting diode technology, and the electro-optical system is in a reflective mirror state reflecting ambient light when the display is not transmitting light and the active retarding layer is in the non-retarding state in which the active retarding layer does not alter the polarization of the light traveling through it. In the same embodiment, the electro-optical system is in a visual display state when the display is transmitting the light and the active retarding layer is in the retarding state in which the active retarding layer alters the polarization of the light traveling through it.

In another embodiment of the method 98, the reflective layer comprises a display, which may comprise organic or inorganic light emitting diode technology, and while the active retarding layer is in the non-retarding state the electro-optical system is in a reflective mirror state reflecting ambient light while light is transmitted from the display.

In yet another embodiment of the method 98, the electro-optical system comprises a dimmable mirror and a light sensor, and when the light sensor detects more of the light the active retarding layer is put into the retarding state causing the dimmable mirror to have lower reflectivity. In the same embodiment, when the light sensor detects less of the light the active retarding layer is put into the non-retarding state causing the dimmable mirror to have higher reflectivity.

Figure 9:
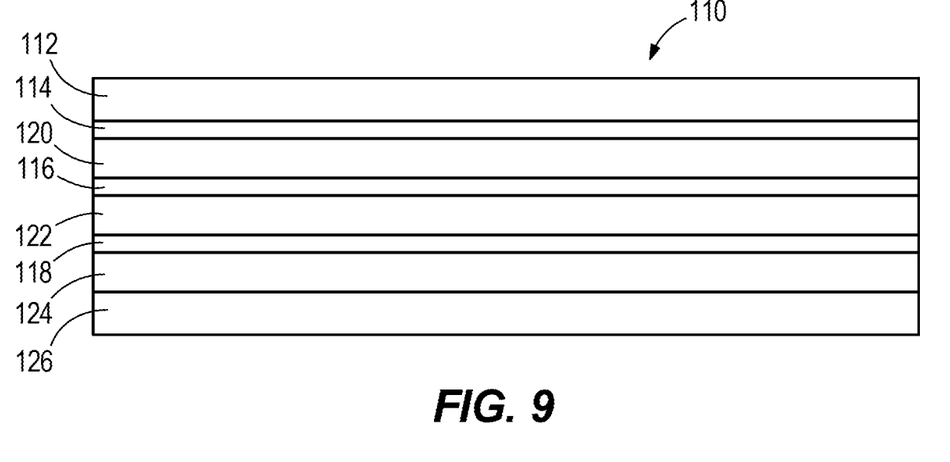
FIG. 9 illustrates a cross-section view through one embodiment of an electro-optical device that may be substituted for the electro-optical device of the electro-optical system of FIG. 1.

The electro-optical system 10 of FIG. 1 may be used in conjunction with a touch sensor in order to control the electro-optical system 10 or to control any other system or device. FIG. 9 illustrates a cross-section view through one embodiment of an electro-optical device 110 that may be substituted for the electro-optical device 31 of the electro-optical system 10 of FIG. 1. The electro-optical device 110 comprises a touch sensor 112, optical lamination layers 114, 116, and 118, an active polarizing layer 120, a retarding layer 122, an organic light emitting diode encapsulant substrate 124, and an organic light emitting diode backplane 126.

The touch sensor 112 may comprise any type of touch sensor such as a single sided Indium Tin Oxide touch sensor, a double sided Indium Tin Oxide touch sensor, a metal mesh, or another touch sensor of varying type or material. The touch sensor 112 may be used to control the electro-optical system 10 of FIG. 1. For instance, as shown collectively in FIGS. 1 and 9, the touch sensor 112 may be configured to control, through the processor 12 which controls the levels of voltage being supplied by the voltage supply device 14 to the active polarizing layer 120 to control the polarity of the active polarizing layer 120, whether the electro-optical system 10 of FIG. 1 is in the reflective mirror state reflecting the ambient light 58 or in the visual display state displaying the light 60 transmitted from the organic light emitting diode encapsulant substrate 124 and the organic light emitting diode backplane 126.

The optical lamination layer 114 comprises a transparent or substantially clear layer binding the touch sensor 112 to the active polarizing layer 120. The optical lamination layer 114 may comprise a liquid optically clear adhesive, or another type of optically clear adhesive. The optical lamination layer 116 comprises a transparent or substantially clear layer binding the active polarizing layer 120 to the retarding layer 122. The optical lamination layer 116 may comprise a liquid optically clear adhesive, or another type of optically clear adhesive. The optical lamination layer 118 comprises a transparent or substantially clear layer binding the retarding layer 122 to the organic light emitting diode encapsulant substrate 124. The optical lamination layer 118 may comprise a liquid optically clear adhesive, or another type of optically clear adhesive. The organic light emitting diode encapsulant substrate 124 and the organic light emitting diode backplane 126 are bound together. In other embodiments, instead of using optically laminated layers to bind layers, air-gaps may be disposed in between the layers.

Figure 10:
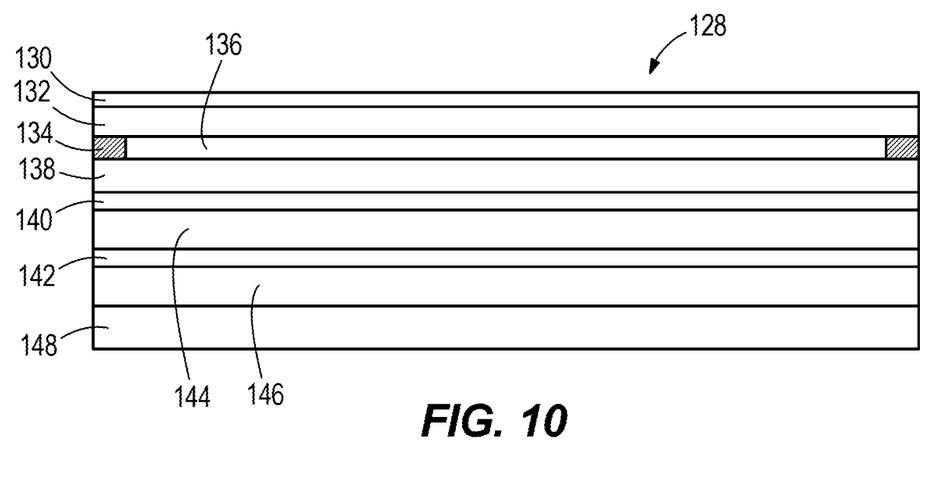
FIG. 10 illustrates a cross-section view showing in more detail an electro-optical device that may be substituted for the electro-optical device of the electro-optical system of FIG. 1.

FIG. 10 illustrates a cross-section view showing in more detail an electro-optical device 128 that may be substituted for the electro-optical device 31 of the electro-optical system 10 of FIG. 1. The electro-optical device 128 comprises a touch sensor 130, active polarizer substrate 132, an active polarizer glue seal 134, an active polarizer dichroic liquid crystal 136, an active polarizer substrate 138, optical lamination layers 140 and 142, retarding layer 144, organic light emitting encapsulant substrate 146, and organic light emitting diode backplane 148. The active polarizer substrate 132, the active polarizer glue seal 134, the active polarizer dichroic liquid crystal 136, and the active polarizer substrate 138 are bound together.

The touch sensor 130 of FIG. 10 is bound directly to and on the active polarizer substrate 132. The touch sensor 130 may comprise any type of touch sensor such as an Indium Tin Oxide touch sensor, or another touch sensor of varying type or material. The touch sensor 130 may be used to control the electro-optical system 10 of FIG. 1. For instance, as shown collectively in FIGS. 1 and 10, the touch sensor 130 may be configured to control, through the processor 12 which controls the levels of voltage being supplied by the voltage supply device 14 to the active polarizer dichroic liquid crystal 136 to control the polarity of the active polarizer dichroic liquid crystal 136, whether the electro-optical system 10 of FIG. 1 is in the reflective mirror state reflecting the ambient light 58 or in the visual display state displaying the light 60 transmitted from the organic light emitting encapsulant substrate 146 and the organic light emitting diode backplane 148.

The optical lamination layer 140 comprises a transparent or substantially clear layer binding the active polarizer substrate 138 to the retarding layer 144. The optical lamination layer 140 may comprise a liquid optically clear adhesive, or another type of optically clear adhesive. The optical lamination layer 142 comprises a transparent or substantially clear layer binding the retarding layer 144 to the organic light emitting diode encapsulant substrate 146. The optical lamination layer 142 may comprise a liquid optically clear adhesive, or another type of optically clear adhesive. The organic light emitting diode encapsulant substrate 146 and the organic light emitting diode backplane 148 are bound together.

Figure 11:
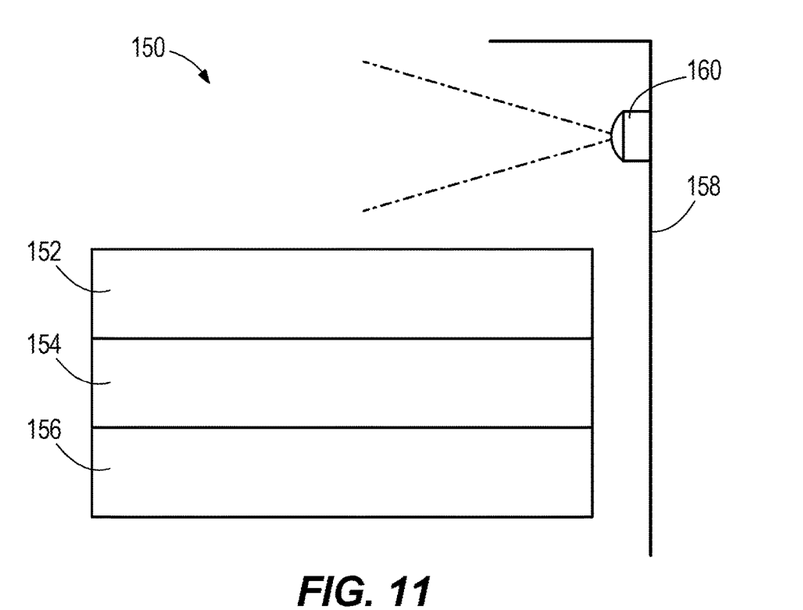
FIG. 11 illustrates a cross-sectional view through another embodiment of an electro-optical device that may be substituted for the electro-optical device of the electro-optical system of FIG. 1.

FIG. 11 illustrates a cross-sectional view through another embodiment of an electro-optical device 150 that may be substituted for the electro-optical device 31 of the electro-optical system 10 of FIG. 1. The electro-optical device 150 comprises an active polarizing layer 152, a retarding layer 154, a reflective layer 156, a bezel 158, and a touch sensor 160. The only difference between the electro-optical device 150 of FIG. 11 and the electro-optical device 31 of FIG. 1 is the bezel 158 and the touch sensor 160 of FIG. 11. The touch sensor 160 comprises an infrared emitter/receiver in communication with the processor 12 of FIG. 1. The touch sensor 160 is attached to the bezel 158 in a position in which it detects touch of the active polarizing layer 152.

The touch sensor 160 may be used to control the electro-optical system 10 of FIG. 1. For instance, as shown collectively in FIGS. 1 and 11, the touch sensor 130 may be configured to control, through the processor 12 which controls the levels of voltage being supplied by the voltage supply device 14 to the active polarizing layer 152, whether the electro-optical system 10 of FIG. 1 is in the reflective mirror state reflecting the ambient light 58 or in the visual display state displaying the light 60 transmitted from the organic light emitting diode of the reflective layer 156.

Figure 12:
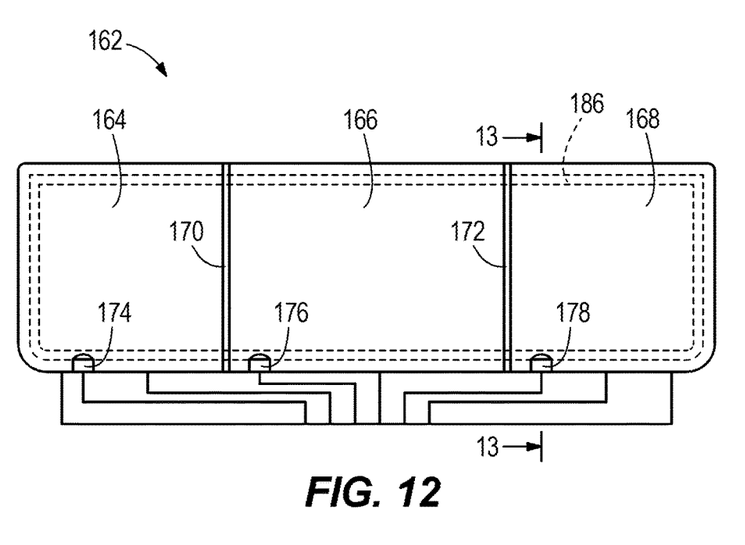
FIG. 12 illustrates a top view of one embodiment of an active polarizing layer which may be substituted for the active polarizing layer of the electro-optical device of the electro-optical system of FIG. 1.
Figure 13:
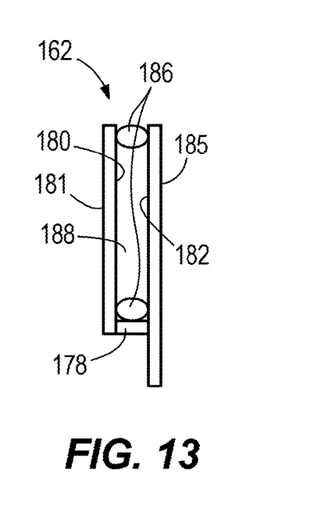
FIG. 13 illustrates a cross-sectional view through line 13-13 of the active polarizing layer of FIG. 12.

FIG. 12 illustrates a top view of one embodiment of an active polarizing layer 162 which may be substituted for the active polarizing layer 16 of the electro-optical device 31 of the electro-optical system 10 of FIG. 1. FIG. 13 illustrates a cross-sectional view through line 13-13 of the active polarizing layer 162 of FIG. 12. As shown collectively in FIGS. 12 and 13, the active polarizing layer 162 comprises controllable portions 164, 166, and 168, non-conductive layers 170 and 172, conductive connectors 174, 176, and 178, conductive layers 180 and 182, substrates 181 and 185, seal 186, and a dye doped liquid crystal 188.

Although FIG. 13 shows the cross-sectional view through controllable portion 168, controllable portions 164 and 166 have identical cross-sections. Controllable portions 164, 166, and 168 are each configured to be independently controllable by the processor 12 of FIG. 1 to each independently switch between being in a reflective mirror state reflecting ambient light 58 to being in a visual display state displaying light transmitted from the light emitting diode of the reflective layer 20. The voltage supply device 14 of FIG. 1 is connected to each of the controllable portions 164, 166, and 168 through each of their respective conductive layers 180 and 182. Conductive connectors 174, 176, and 178 are utilized to transfer counter-opposing voltage to the opposing conductive layer 180 of each of the respective controllable portions 164, 166, and 168 such that an electric field is created between the respective opposing conductive layers 180 and 182 of each of the controllable portions 164, 166, and 168. The processor 12 of FIG. 1 controls the voltage supply device 14 to independently supply controllable portions 164, 166, and 168 with varying levels of voltage so that they are independently controllable. In other embodiments, a plurality of the voltage supply device 14 may be used to independently supply controllable portions 164, 166, and 168 with varying levels of voltage so that they are independently controllable.

The non-conductive layers 170 and 172 between the controllable portions 164, 166, and 168 allow for the controllable portions 164, 166, and 168 to be independently controlled by providing non-conductive breaks between one or more of the conductive layers 180 and 182 of the controllable portions 164, 166, and 168 so that different voltages, supplied by the voltage supply device 14 of FIG. 1, may be applied independently to each of the controllable portions 164, 166, and 168. In other embodiments, any type of non-conductive layers may be substituted for the non-conductive layers 170 and 172.

The conductive layers 180 and 182 of each of the controllable portions 164, 166, and 168 are electrically connected to one another by their respective conductive connectors 174, 176, and 178. Seal 186 seals the dye doped liquid crystal 188 between the conductive layers 180 and 182. When voltage is supplied by the voltage supply device 14 of FIG. 1 the dye doped liquid crystal 188 activates and changes orientation to change the polarity of the active polarizing layer 162 as previously discussed. In such manner, the dye doped liquid crystal 188 will have one orientation when no voltage is supplied and will gradually change orientation as increased voltage is supplied.

The controllable portions 164, 166, and 168 may each be independently manually or automatically controlled to switch back and forth independently between reflective mirror states and display states. For instance, in one embodiment in which the electro-optical system 10 comprises a rear-view mirror of an automobile, in a normal driving state without the turning signal on the controllable portions 164, 166, and 168 are each in a reflective mirror state. However, when the turn signal is turned on, the processor 12 of FIG. 1 controls the voltage supply device 14 to supply varying levels of voltages to the controllable portions 164, 166, and 168 so that controllable portion 164 switches to an overhead display showing a bird's eye view of the automobile, so that controllable portion 166 remains in a reflective mirror state, and so that controllable portion 168 switches to a blind-spot display showing a blind-spot of the automobile. Each of the controllable portions 164, 166, and 168 may also have their own dedicated touch sensor, and/or share a touch sensor which controls each of them independently, and be independently manually controlled by the touch of the driver or a passenger in the car as previously discussed regarding FIGS. 9-11. In other embodiments, any number of independently controllable portions may be utilized.

Figure 14:
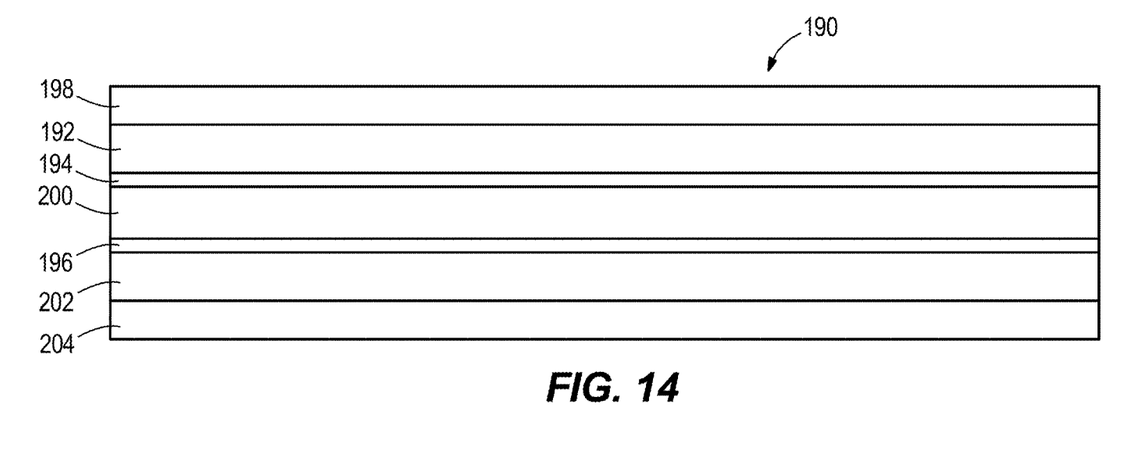
FIG. 14 illustrates a cross-sectional view through another embodiment of an electro-optical device that may be substituted for the electro-optical device of the electro-optical system of FIG. 4.

The electro-optical system 10 of FIG. 4 may also be used in conjunction with a touch sensor in order to control the electro-optical system 62 or to control any other system or device. FIG. 14 illustrates a cross-section view through one embodiment of an electro-optical device 190 that may be substituted for the electro-optical device 83 of the electro-optical system 62 of FIG. 4. The electro-optical device 190 comprises a touch sensor 192, optical lamination layers 194 and 196, a passive polarizing layer 198, an active retarding layer 200, an organic light emitting diode encapsulant substrate 202, and an organic light emitting diode backplane 204.

The touch sensor 192 may comprise any type of touch sensor such as a single sided Indium Tin Oxide touch sensor, a double sided Indium Tin Oxide touch sensor, a metal mesh, or another touch sensor of varying type or material. The touch sensor 192 may be used to control the electro-optical system 62 of FIG. 4. For instance, as shown collectively in FIGS. 4 and 14, the touch sensor 192 may be configured to control, through the processor 64 which controls the levels of voltage being supplied by the voltage supply device 66 to the active retarding layer 200 to control the polarity of the active retarding layer 200, whether the electro-optical system 62 of FIG. 4 is in the reflective mirror state reflecting the ambient light 85 or in the visual display state displaying the light 84 transmitted from the organic light emitting diode encapsulant substrate 202 and the organic light emitting diode backplane 204.

The touch sensor 192 is bound to and between the passive polarizing layer 198 and the optical lamination layer 194. In another embodiment, the touch sensor 192 could be disposed on top of the passive polarizing layer 198 with the passive polarizing layer 198 disposed between the touch sensor 192 and the active retarding layer 200. In other embodiments, the touch sensor 192 could be disposed anywhere as long as the touch sensor 192 is disposed in front of the active retarding layer 200 to avoid shorting out the electric field for the touch sensor 192. The optical lamination layer 194 comprises a transparent or substantially clear layer binding the touch sensor 192 to the active retarding layer 200. The optical lamination layer 194 may comprise a liquid optically clear adhesive, or another type of optically clear adhesive. The optical lamination layer 196 comprises a transparent or substantially clear layer binding the active retarding layer 200 to the organic light emitting diode encapsulant substrate 202. The optical lamination layer 196 may comprise a liquid optically clear adhesive, or another type of optically clear adhesive. The organic light emitting diode encapsulant substrate 202 and the organic light emitting diode backplane 204 are bound together.

Figure 15:
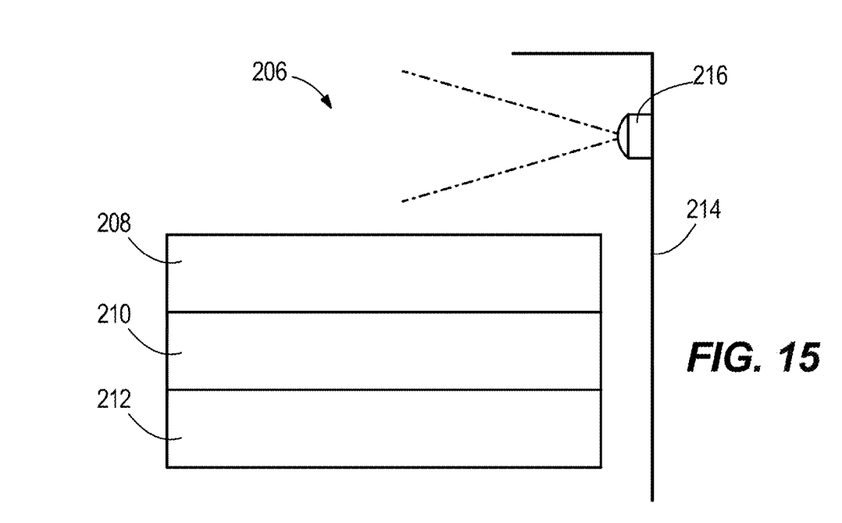
FIG. 15 a cross-sectional view through another embodiment of an electro-optical device that may be substituted for the electro-optical device of the electro-optical system of FIG. 4.

FIG. 15 illustrates a cross-sectional view through another embodiment of an electro-optical device 206 that may be substituted for the electro-optical device 83 of the electro-optical system 62 of FIG. 4. The electro-optical device 206 comprises a passive polarizing layer 208, an active retarding layer 210, a reflective layer 212, a bezel 214, and a touch sensor 216. The only difference between the electro-optical device 206 of FIG. 15 and the electro-optical device 83 of FIG. 4 is the bezel 214 and the touch sensor 216 of FIG. 15. The touch sensor 216 comprises an infrared emitter/receiver in communication with the processor 64 of FIG. 4. The touch sensor 216 is attached to the bezel 214 in a position in which it detects touch of the passive polarizing layer 208.

The touch sensor 216 may be used to control the electro-optical system 62 of FIG. 4. For instance, as shown collectively in FIGS. 4 and 15, the touch sensor 216 may be configured to control, through the processor 64 which controls the levels of voltage being supplied by the voltage supply device 66 to the active retarding layer 210 to control the polarity of the active retarding layer 210, whether the electro-optical system 62 of FIG. 4 is in the reflective mirror state reflecting the ambient light 85 or in the visual display state displaying the light 84 transmitted from the organic light emitting diode of the reflective layer 212.

Figure 16:
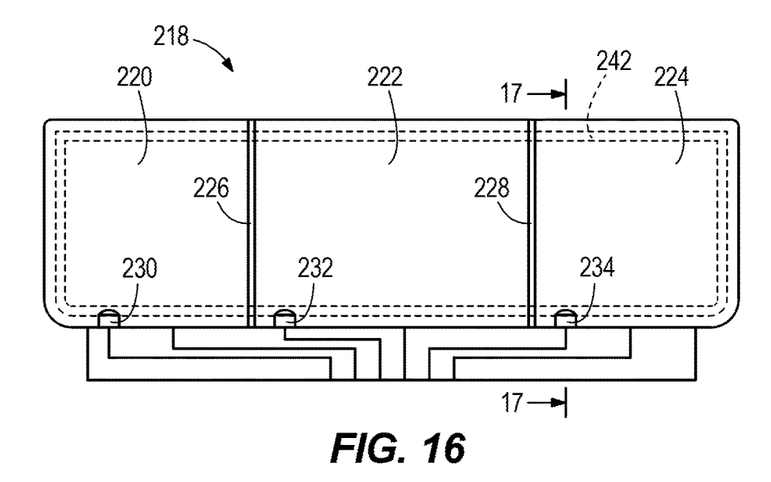
FIG. 16 illustrates a top view of one embodiment of an active retarding layer which may be substituted for the active retarding layer of the electro-optical device of the electro-optical system of FIG. 4.
Figure 17:
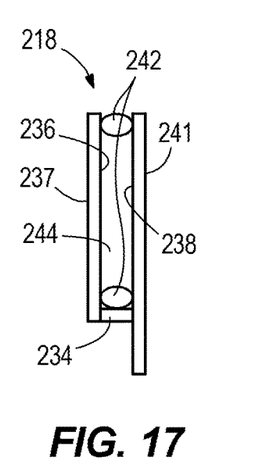
FIG. 17 illustrates a cross-sectional view through line 17-17 of the active retarding layer of FIG. 16.

FIG. 16 illustrates a top view of one embodiment of an active retarding layer 218 which may be substituted for the active retarding layer 70 of the electro-optical device 83 of the electro-optical system 62 of FIG. 4. FIG. 17 illustrates a cross-sectional view through line 17-17 of the active retarding layer 218 of FIG. 16. As shown collectively in FIGS. 16 and 17, the active retarding layer 218 comprises controllable portions 220, 222, and 224, non-conductive layers 226 and 228, conductive connectors 230, 232, and 234, conductive layers 236 and 238, substrates 237 and 241, seal 242, and a liquid crystal 244.

Although FIG. 17 shows the cross-sectional view through controllable portion 224, controllable portions 220 and 222 have identical cross-sections. Controllable portions 220, 222, and 224 are each configured to be independently controllable by the processor 64 of FIG. 4 to each independently switch between being in a reflective mirror state reflecting ambient light 82 to being in a visual display state displaying light transmitted from the light emitting diode of the reflective layer 72. The voltage supply device 66 of FIG. 4 is connected to each of the controllable portions 220, 222, and 224 through each of their respective conductive layers 236 and 238. Conductive connectors 230, 232, and 234 are utilized to transfer counter-opposing voltage to the opposing conductive layer 236 of each of the respective controllable portions 220, 222, and 224 such that an electric field is created between the respective opposing conductive layers 236 and 238 of each of the controllable portions 220, 222, and 224. The processor 64 of FIG. 4 controls the voltage supply device 66 to independently supply controllable portions 220, 222, and 224 with varying levels of voltage so that they are independently controllable. In other embodiments, a plurality of the voltage supply device 66 may be used to independently supply controllable portions 220, 222, and 224 with varying levels of voltage so that they are independently controllable.

The non-conductive layers 226 and 228 between the controllable portions 220, 222, and 224 allow for the controllable portions 220, 222, and 224 to be independently controlled by providing non-conductive breaks between one or more of the conductive layers 236 and 238 of the controllable portions 220, 222, and 224 so that different voltages, supplied by the voltage supply device 66 of FIG. 4, may be applied independently to each of the controllable portions 220, 222, and 224. In other embodiments, any type of non-conductive layers may be substituted for the non-conductive layers 226 and 228.

The conductive layers 236 and 238 of each of the controllable portions 220, 222, and 224 are electrically connected to one another by their respective conductive connectors 230, 232, and 234. Seal 242 seals the liquid crystal 244 between the conductive layers 236 and 238. When voltage is supplied by the voltage supply device 66 of FIG. 4 the liquid crystal 244 activates and changes orientation to change the polarity of the active retarding layer 218 as previously discussed. In such manner, the liquid crystal 244 will have one polarity when no voltage is supplied and will gradually change polarity as increased voltage is supplied.

The controllable portions 220, 222, and 224 may each be independently manually or automatically controlled to switch back and forth independently between reflective mirror states and display states. For instance, in one embodiment in which the electro-optical system 62 comprises a rear-view mirror of an automobile, in a normal driving state without the turning signal on the controllable portions 220, 222, and 224 are each in a reflective mirror state. However, when the turn signal is turned on, the processor 64 of FIG. 4 controls the voltage supply device 66 to supply varying levels of voltages to the controllable portions 220, 222, and 224 so that controllable portion 220 switches to an overhead display showing a bird's eye view of the automobile, so that controllable portion 222 remains in a reflective mirror state, and so that controllable portion 224 switches to a blind-spot display showing a blind-spot of the automobile. Each of the controllable portions 220, 222, and 224 may also have their own dedicated touch sensor, and/or share a touch sensor which controls each of them independently, and be independently manually controlled by the touch of the driver or a passenger in the car as previously discussed regarding FIGS. 14-15. In other embodiments, any number of independently controllable portions may be utilized.

Figure 18:
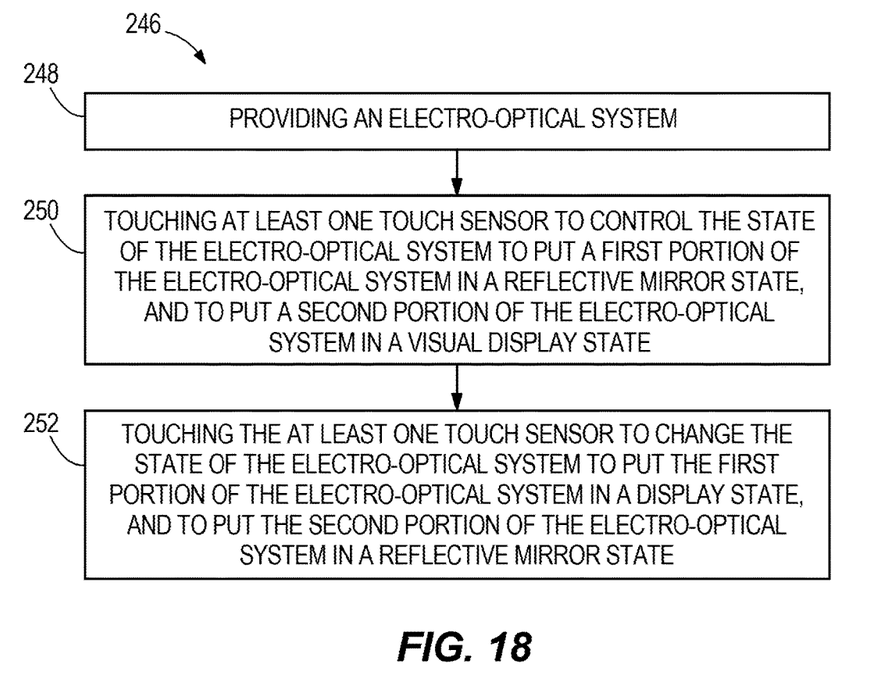
FIG. 18 is a flowchart illustrating one embodiment of a method of operating an electro-optical system.

FIG. 18 is a flowchart illustrating one embodiment of a method 246 of operating an electro-optical system. Step 248 comprises providing an electro-optical system. The electro-optical system may comprise any of the electro-optical systems disclosed herein. Step 250 comprises touching at least one touch sensor to control the state of the electro-optical system to put a first portion of the electro-optical system in a reflective mirror state, and to put a second portion of the electro-optical system in a visual display state. During step 250 a processor controls one or more voltage supply devices to supply varying levels of voltage to the first portion and the second portion of the electro-optical system to change a polarization state of their active polarizing layer or their active retarding layer. Step 252 comprises touching the at least one touch sensor to change the state of the electro-optical system to put the first portion of the electro-optical system in a display state, and to put the second portion of the electro-optical system in a reflective mirror state. During step 252 the processor controls the one or more voltage supply devices to supply varying levels of voltage to the first portion and the second portion of the electro-optical system to change the polarization state of their active polarizing layer or their active retarding layer.

In another embodiment of the method 246, steps 250 and 252 are modified so that the first and second portions of the electro-optical system are automatically independently controlled to independently switch between reflective mirror and visual display states.

In yet another embodiment of the method 246, steps 250 and 252 are modified so that only one portion of the electro-optical system is manually or automatically controlled to switch back and forth between a reflective mirror state and a visual display state.

While particular aspects of the present subject matter described herein have been shown and described, it will be apparent to those skilled in the art that, based upon the teachings herein, changes and modifications may be made without departing from the subject matter described herein and its broader aspects.

The invention claimed is:

1. An electro-optical system comprising:
a voltage supply device;
an active polarizing layer electrically coupled to the voltage supply device, the active polarizing layer configured to switch back and forth between a non-polarized state and a polarized state as the voltage supply device supplies varying levels of voltage;
a retarding layer configured to alter the polarization state of light traveling through the retarding layer; and
a reflective layer positioned adjacent to the retarding layer, wherein the reflective layer includes an organic light emitting diode display.

2. The electro-optical system of claim 1, wherein the electro-optical system is configured to, in one state, be a reflective mirror reflecting ambient light, and in another state, be a visual display displaying light transmitted from the organic light emitting diode display.

3. The electro-optical system of claim 2, wherein the electro-optical system is configured to be in the reflective mirror state when the organic light emitting diode display is not transmitting the light and the active polarizing layer is in the non-polarized state, and the electro-optical system is configured to be in the visual display state when the organic light emitting diode display is transmitting the light and the active polarizing layer is in the polarized state.

4. The electro-optical system of claim 1, wherein the retarding layer comprises a ¼ wavelength retarding layer.

5. The electro-optical system of claim 1, wherein the active polarizing layer comprises a guest-host dichroic dye liquid crystal system.

6. The electro-optical system of claim 1, wherein the active polarizing layer comprises a vertical transmission axis.

7. The electro-optical system of claim 1, wherein the retarding layer is abutted against and between the active polarizing layer and the reflective layer.

8. The electro-optical system of claim 1, wherein the reflective layer includes a dimmable mirror, the dimmable mirror is configured to have higher reflectivity when the active polarizing layer is in the non-polarized state, and the dimmable mirror is configured to have lower reflectivity when the active polarizing layer is in the polarized state.

9. The electro-optical system of claim 8, further comprising a forward looking light sensor and a rear-looking light sensor, wherein when the rear-looking light sensor detects more light than the forward-looking light sensor, the voltage supply device is configured to put the active polarizing layer into the polarized state.

10. The electro-optical system of claim 1, further comprising a touch sensor configured to control the electro-optical system.

11. The electro-optical system of claim 1, wherein the active polarizing layer includes a first controllable portion and a second controllable portion.

12. The electro-optical system of claim 11, wherein the first controllable portion and the second controllable portion are each configured to be independently controllable, wherein the first controllable portion and the second controllable portion are each configured to independently switch between being in a reflective mirror state for reflecting ambient light to being in a visual display state for displaying light transmitted from the organic light emitting diode display.

13. The electro-optical system of claim 11, wherein the active polarizing layer comprises a non-conductive layer between the first controllable portion and the second controllable portion.

14. The electro-optical system of claim 11, wherein the voltage supply device is configured to independently supply the first controllable portion and the second controllable portion with varying levels of voltage for independently controlling the first controllable portion and the second controllable portion.

* * * * *